(12) United States Patent
Kobayashi et al.

(10) Patent No.: US 8,053,936 B2
(45) Date of Patent: Nov. 8, 2011

(54) POWER SUPPLY CIRCUIT AND SIGNAL DETECTION APPARATUS

(75) Inventors: Daisuke Kobayashi, Kariya (JP);
Terumoto Ogasawara, Gamagori (JP)

(73) Assignee: Denso Corporation, Kariya (JP)

( * ) Notice: Subject to any disclaimer, the term of this patent is extended or adjusted under 35 U.S.C. 154(b) by 235 days.

(21) Appl. No.: 12/574,243

(22) Filed: Oct. 6, 2009

(65) Prior Publication Data

US 2010/0084216 A1 Apr. 8, 2010

(30) Foreign Application Priority Data

Oct. 7, 2008 (JP) ................................. 2008-261010

(51) Int. Cl.
*G04C 21/28* (2006.01)
(52) U.S. Cl. ....................................................... 307/156
(58) Field of Classification Search .................... 307/156
See application file for complete search history.

(56) References Cited

U.S. PATENT DOCUMENTS

| | | | |
|---|---|---|---|
| 7,265,458 B2 * | 9/2007 | Edelen et al. | 307/65 |
| 2004/0093961 A1 | 5/2004 | Nakane et al. | |

FOREIGN PATENT DOCUMENTS

| JP | 54-73931 | 5/1979 |
|---|---|---|
| JP | 54-105743 | 8/1979 |
| JP | 3-249529 | 11/1991 |
| JP | 5-112189 | 5/1993 |
| JP | 10-108363 | 4/1998 |
| JP | 2003-137111 | 5/2003 |
| JP | 2007-295658 | 11/2007 |
| JP | 2008-302825 | 12/2008 |

OTHER PUBLICATIONS

Japanese Office Action dated Jul. 27, 2010, issued in corresponding Japanese Application No. 2008-261010, with English translation.

* cited by examiner

*Primary Examiner* — Robert L. Deberadinis
(74) *Attorney, Agent, or Firm* — Nixon & Vanderhye PC

(57) ABSTRACT

In a power supply circuit, first and second loads are connected in parallel to a power source though first and second power lines, respectively. A power line connector connects the first and second power lines together in such a manner that even when one of the first and second power lines is broken, the first and second loads are supplied with electric power from the power source through the other of the first and second power lines. A rectifier device is connected to each of the first and second power lines between the power source and the power line connector. The rectifier device allows an electric current in a direction from the power source to the first and second loads and blocks the electric current in opposite direction.

10 Claims, 6 Drawing Sheets

POWER SUPPLY CIRCUIT AND SIGNAL DETECTION APPARATUS

CROSS REFERENCE TO RELATED APPLICATION

This application is based on and incorporates herein by reference Japanese Patent Application No. 2008-261010 filed on Oct. 7, 2008.

FIELD OF THE INVENTION

The present invention relates to a power supply circuit for supplying electric power from a power source to a load and also relates to a signal detection apparatus using the power supply circuit.

BACKGROUND OF THE INVENTION

As disclosed in, for example, JP-A-2003-137111, multiple wiring systems are typically used in a power supply circuit or a signal detection apparatus. Each wiring system has the same function to provide redundancy. Thus, even when some of the wiring systems are broken, the power supply circuit or the signal detection apparatus can operate normally.

Examples of faults in a power line include an earth (ground) fault in addition to a break fault. The earth fault means that an electric current flowing through the power line flows to the earth due to the fact that the power line is electrically connected to the earth.

For example, in FIG. 6, each Hall IC is supplied with electric power through two power lines PL11 and PL12. In such a case, if the power line PL12 is connected to the earth at a point EF, an electric current flowing through the power line PL12 flows to the earth from the point EF. Further, since the power line PL11 and the power line PL12 are electrically connected together, an electric current flowing through the power line PL12 also flows to the earth from the point EF.

As described above, in a power supply circuit or a signal detection apparatus having multiple power wiring systems, the power wiring systems are electrically connected together. Therefore, when an earth fault occurs in one power wiring system, the other power wiring systems may be affected by the earth fault.

SUMMARY OF THE INVENTION

In view of the above, it is an object of the present invention to provide a power supply circuit and a signal detection apparatus having multiple power wiring systems configured to prevent an earth fault in one power wiring system from affecting the other power wiring systems.

According to a first aspect of the present invention, a power supply circuit includes a power source, a first load, a second load, a first power line, a second power line, a power line connector, a first rectifier device, and a second rectifier device. The first load is connected in parallel to the power source though the first power line. The second load is connected in parallel to the power source through the second power line. The power line connector connects the first and second power lines together in such a manner that even when one of the first and second power lines is broken, each of the first and second loads is supplied with electric power from the power source through the other of the first and second power lines. The first rectifier device is connected to the first power line between the power source and the power line connector. The first rectifier device allows an electric current in a first direction from the power source to the first load and blocks the electric current in a second direction opposite to the first direction. The second rectifier device is connected to the second power line between the power source and the power line connector. The second rectifier device allows the electric current in a third direction from the power source to the second load and blocks the electric current in a fourth direction opposite to the third direction.

According to a second aspect of the present invention, a signal detection apparatus includes a first signal detector, a second signal detector, a power source, a first power line, a second power line, a first signal line, a second signal line, a signal detection circuit, a power line connector, a first rectifier device, and a second rectifier device. The first signal detector outputs a first signal by detecting a predetermined target. The second signal detector outputs a second signal by detecting the predetermined target. The first signal detector is connected in parallel to the power source though the first power line. The second signal detector is connected in parallel to the power source through the second power line. The first signal line carries the first signal. The second signal line carries the second signal. The signal detection circuit detects the first and second signals through the first and second signal lines.

The power line connector connects the first and second power lines together in such a manner that even when one of the first and second power lines is broken, each of the first and second signal detectors is supplied with electric power from the power source through the other of the first and second power lines. The first rectifier device is connected to the first power line between the power source and the power line connector. The first rectifier device allows an electric current in a first direction from the power source to the first signal detector and blocks the electric current in a second direction opposite to the first direction. The second rectifier device is connected to the second power line between the power source and the power line connector. The second rectifier device allows the electric current in a third direction from the power source to the second signal detector and blocks the electric current in a fourth direction opposite to the third direction.

According to a third aspect of the present invention, a signal detection apparatus includes a first signal detector, a second signal detector, a third signal detector, a power source, a first power line, a second power line, a third power line, a first signal line, a second signal line, a third signal line, a signal detection circuit, a power line connector, a first rectifier device, and a second rectifier device. The first signal detector outputs a first signal by detecting a predetermined target. The second signal detector outputs a second signal by detecting the predetermined target. The third signal detector outputs a third signal by detecting the predetermined target. The first signal detector is connected in parallel to the power source though the first power line. The second signal detector is connected in parallel to the power source through the second power line. The third signal detector is connected to each of the first and second power lines through the third power line. The first signal line carries the first signal. The second signal line carries the second signal. The third signal line carries the third signal. The signal detection circuit detects the first, second, and third signals through the first, second, and third signal lines. The power line connector connects the first and second power lines together in such a manner that even when one of the first and second power lines is broken, each of the first and second signal detectors is supplied with electric power from the power source through the other of the first and second power lines. The first rectifier device is connected to the first power line between the power source and the power line connector. The first rectifier device allows an electric current in a first direction from the power source to the first signal detector and blocks the electric current in a second direction opposite to the first direction. The second rectifier device is connected to the second power line between the power source and the power line connector. The second rectifier device allows the electric current in a third direction from the power source to the second signal detector and blocks the electric current in a fourth direction opposite to the third direction. The third power line is connected to the first power line between the first rectifier device and the first signal detector and connected to the second power line between the second rectifier device and the second signal detector.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
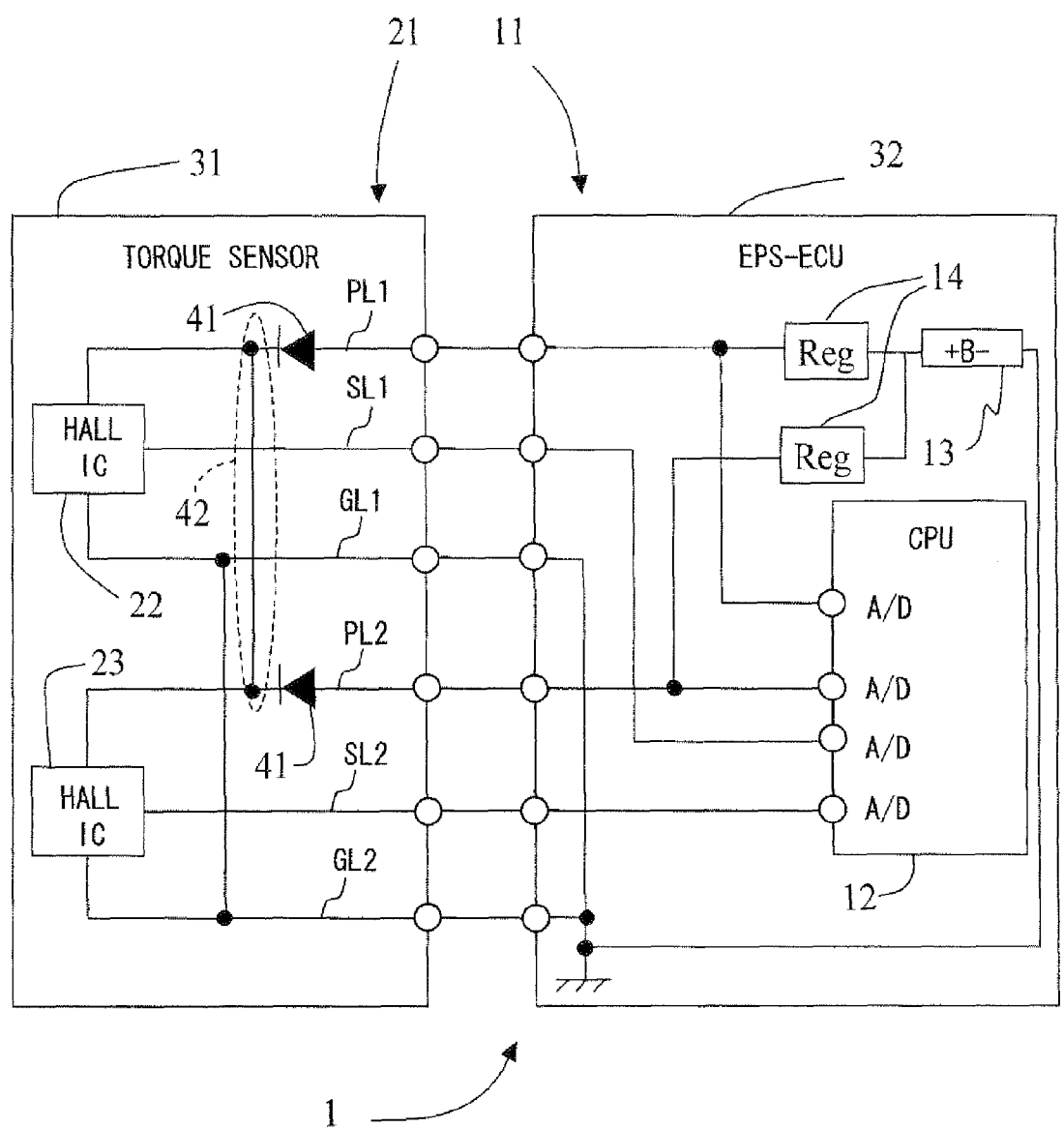
FIG. 1 is a diagram illustrating a signal detection apparatus according to a first embodiment of the present invention.

A signal detection apparatus 1 according to a first embodiment of the present invention is described below with reference to FIG. 1. For example, the signal detection apparatus 1 can be used for an electric power steering (EPS) apparatus, which uses an electric motor (not shown) to provide steering assist to a driver of a vehicle. The signal detection apparatus 1 mainly includes a torque sensor 21 and an electric power steering electric control unit (EPS-ECU) 11. The torque sensor 21 detects a steering torque acting on a steering (not shown) of the vehicle. The EPS-ECU 11 controls an electric motor based on the detected steering torque to assist steering effort of the driver.

The torque sensor 21 and the EPS-ECU 11 are connected together through first and second power lines PL1, PL2, first and second signal lines SL1, SL2, and first and second ground lines GL1, GL2.

A power supply circuit is formed with a power source 13, a first Hall IC 22 as a first load (as a first signal detector), a second Hall IC 23 as a second load (as a second signal detector), the first power line PL1, the second power line PL2, a rectifier device 41, and a power line connector 42.

The torque sensor 21 detects the steering torque and transmits a torque signal indicative of the detected steering torque to the EPS-ECU 11 through the first signal line SL1 and the second signal line SL2. The torque sensor 21 includes the first Hall IC 22, the second Hall IC 23, and a first housing 31 for accommodating the first Hall IC 22 and the second Hall IC 23.

The EPS-ECU 11 includes a central processing unit (CPU) 12 as a signal detection circuit, the power source 13, a regulator 14, and a second housing 32 for accommodating the CPU 12, the power source 13, and the regulator 14. The power source 13 is grounded to a chassis of the vehicle (i.e., chassis earth) and supplies electric power to the torque sensor 21 through the first and second power lines PL1, PL2. The regulator 14 is used to keep constant a voltage and a current outputted from the power source 13. The CPU 12 receives the torque signal transmitted from the torque sensor 21 and performs computations necessary to control the motor.

The first power supply line PL1 connects the power source 13 to the first Hall IC 22. The second power supply line PL2 connects the power source 13 to the second Hall IC 23. The power line connector 42 connects the first power line PL1 and the second power line PL2 together. In such an approach, even when one of the first power line PL1 and the second power line PL2 is broken (i.e., disconnected), each of the first Hall IC 22 and the second Hall IC 23 can be supplied with electric power through the other of the first power line PL1 and the second power line PL2.

The rectifier device 41 is provided to each of the first power line PL1 and the second power line PL2 between the power source 13 and the power line connector 42. The rectifier device 41 allows an electric current in a direction from the power source 13 to the first and second Hall ICs 22, 23. In contrast, the rectifier device 41 blocks the electric current in opposite direction.

Thus, the power line connector 42 prevents an earth fault current to flow from one of the first and second power lines PL1, PL2 to the other of the first and second power lines PL1, PL2. Therefore, even when an earth fault occurs in one of the first and second power lines PL1, PL2, each of the first and second Hall ICs 22, 23 can be supplied with electric power from the power source 13 through the other of the first and second power lines PL1, PL2. In this way, even when the earth fault occurs in one of the first and second power lines PL1, PL2, each of the first and second Hall ICs 22, 23 can transmit a detection signal to the CPU 12.

The regulator 14 converts an input voltage into a predetermined output voltage. The regulator 14 is provided to each of the first power line PL1 and the second power line PL2 between the rectifier device 41 and the power source 13. In such an approach, even if the regulator 14 of one of the first and second power lines PL1, PL2 is broken due to an earth fault current caused by an earth fault occurring in the one of the first and second power lines PL1, PL2, the regulator 14 of the other of the first and second power lines PL1, PL2 can be used.

Each of the first and second Hall IC 22, 23 is connected in parallel to the power source 13. The first Hall IC 22 detects a predetermined target and outputs a first detection signal indicative of the detected target. The second Hall IC 23 also detects the predetermined target and outputs a second detection signal indicative of the detected target. In the first embodiment, each of the first and second Hall ICs 22, 23 detects a motor torque by detecting a magnetic field. That is, each of the first and second detection signals corresponds to the torque signal. The first and second detection signals outputted from the first and second Hall ICs 22, 23 are inputted to the CPU 12 of the EPS-ECU 11.

The first signal line SL1 connects the first Hal IC 22 to the CPU 12 and carries the first detection signal to the CPU 12. The second signal line SL2 connects the second Hal IC 23 to the CPU 12 and carries the second detection signal to the CPU 12.

The CPU 12 detects the first and second detection signals through the first and second signal lines SL1, SL2.

It is noted that the first and second detection signals detected by the CPU 12 are opposite in phase. The reasons for this are below. When the first and second detection signals having the same phase are transmitted through the first and second signal lines SL1, SL2, it cannot be distinguished between a case where no signal is outputted and a case where a line break occurs. In contrast, when the first and second detection signals having opposite phase are transmitted through the first and second signal lines SL1, SL2, the CPU 12 can detect a fault (e.g., a line break) in the signal lines SL1, SL2 by determining whether the first and second detection signals are opposite in phase. If the CPU 12 detects the fault in the signals lines SL1, SL2, the steering assist is stopped.

The first and second Hall ICs 22, 23 are connected in parallel to each other through the first ground line GL1. Further, the first and second Hall ICs 22, 23 are connected in parallel to each other through the second ground line GL2.

In such an approach, even when one of the first and second ground lines GL1, GL2 is broken, each of the first and second Hall ICs 22, 23 can be grounded through the other of the first and second ground lines GL1, GL2. Thus, the signal detection apparatus 1 has redundancy so that reliability of the signal detection apparatus 1 can be ensured.

Since the first and second Hall ICs 22, 23 are supplied with electric power from the power source 13 of the EPS-ECU 11, there is a need that a ground potential of the first and second Hall ICs 22, 23 be equal to a ground potential of the power source 13, i.e., the EPS-ECU 11. Therefore, as shown FIG. 1, the first and second Hall ICs 22, 23 are grounded on a EPS-ECU 11 side, not a torque sensor 21 side.

The first and second Hall ICs 22, 23, the power line connector 42, and the rectifier device 41 are accommodated in the first housing 31. The CPU 12 and the power source 13 are accommodated in the second housing 32.

Figure 2:
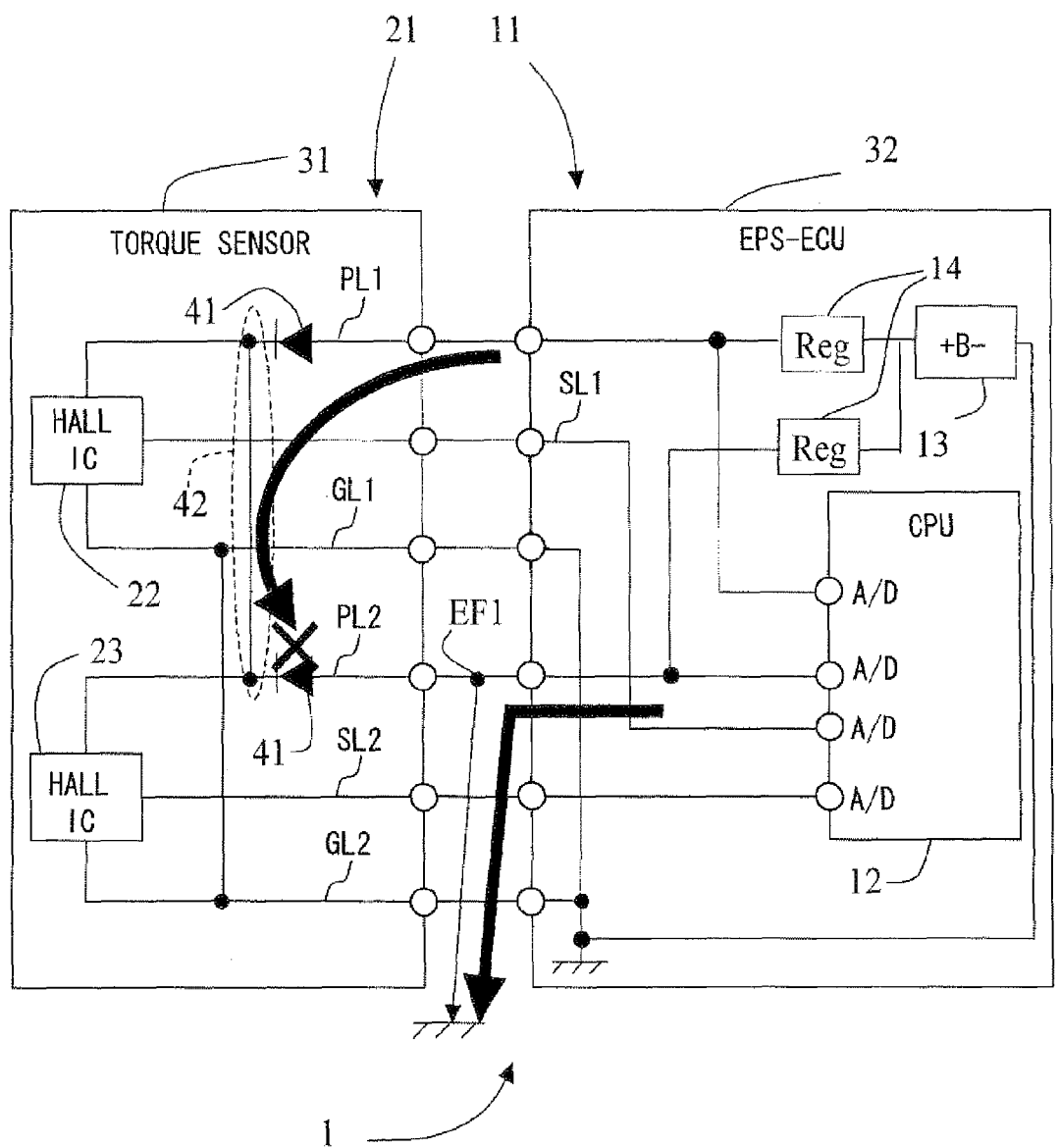
FIG. 2 is a diagram illustrating an electric current flow observed when one power line is grounded in the signal detection apparatus of FIG. 1.

The signal detection apparatus 1 operates as shown in FIG. 2, when an earth fault occurs at a point EF1 of the second power line PL2. In this case, a potential of the second power line PL2 decreases at the point EF1, and an electric current flowing through the second power line PL2 flows to the earth from the point EF1. As a result, the first and second Hall ICs 22, 23 cannot be supplied with electric power through the second power line PL2. In contrast, an electric current flowing through the first power line PL1 does not flow to the point EF1 through the power line connector 42, because the rectifier device 41 is provided to the second power line PL2. Therefore, even when the earth fault occurs in the second power line PL2, the first and second Hall ICs 22, 23 can be supplied with electric power through the first power line PL1.

The lines located between the first and second housings 31, 32 are not covered with the housings 31, 32. Accordingly, an earth fault is likely to occur in the lines located between the first and second housings 31, 32 than in the lines accommodated in the first and second housings 31, 32. However, the rectifier device 41 is accommodated in the first housing 31 together with the first and second Hall ICs 22, 23 and the power line connector 42. Therefore, even when an earth fault occurs in one of the first and second power lines PL1, PL2 between the first and second housings 31, 32, there is no possibility that the other of the first and second power lines PL1, PL2 may be affected by the earth fault.

Second Embodiment

Figure 3:
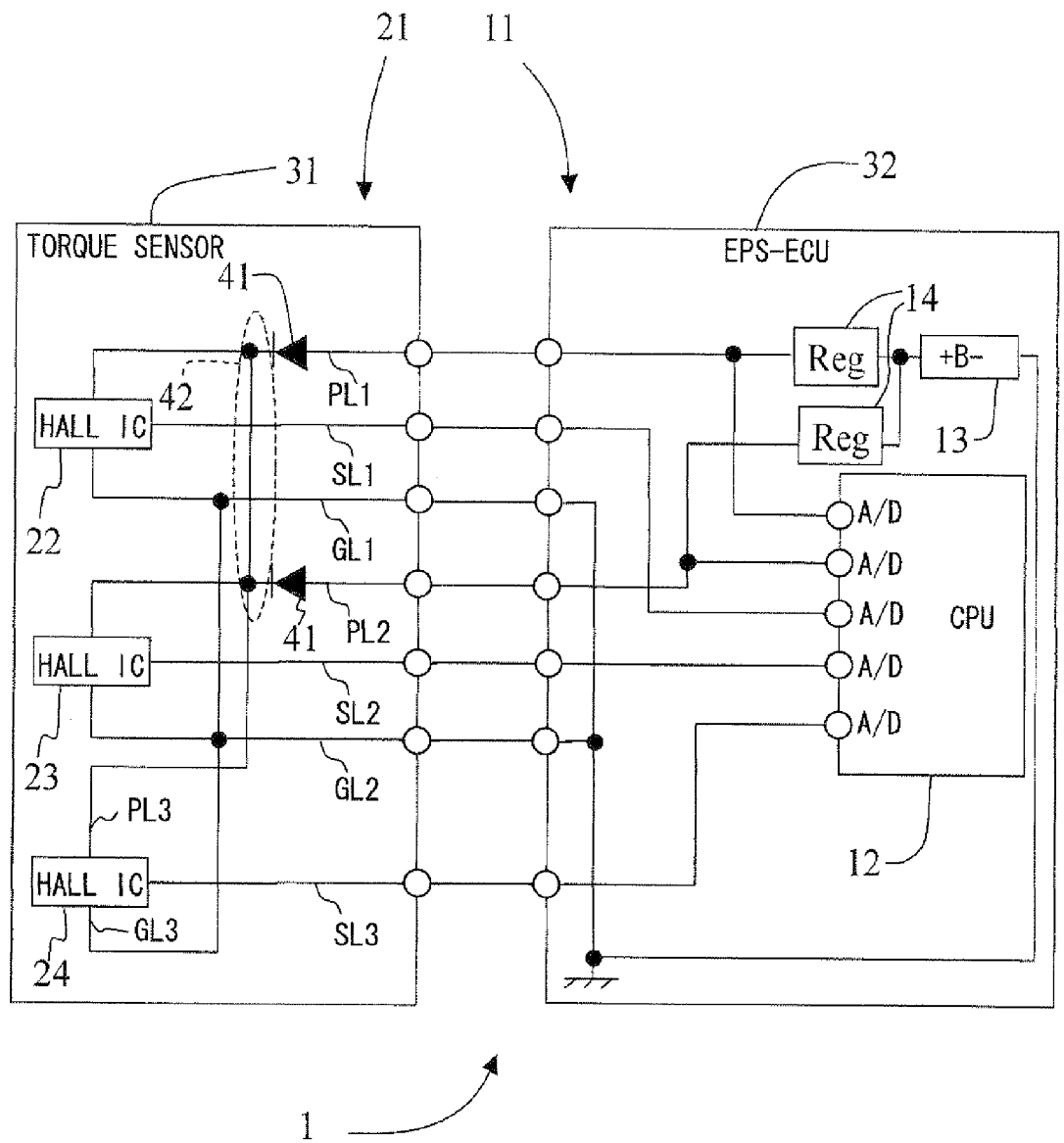
FIG. 3 is a diagram illustrating a signal detection apparatus according to a second embodiment of the present invention.

A signal detection apparatus 1 according to a second embodiment of the present invention is described below with reference to FIG. 3. The signal detection apparatus 1 mainly includes a torque sensor 21 and an EPS-ECU 11.

The torque sensor 21 detects a steering torque acting on a steering (not shown) of a vehicle. The EPS-ECU 11 controls an electric motor based on the detected steering torque to assist steering effort of a driver of the vehicle.

The torque sensor 21 and the EPS-ECU 11 are connected together through first, second, and third power lines PL1-PL3, first, second, and third signal lines SL1-SL3, and first and second ground lines GL1, G2. The torque sensor 21 detects the steering torque and transmits a torque signal indicative of the detected steering torque to the EPS-ECU 11 through the first, second, and third signal lines SL1-SL3. The torque sensor 21 includes a first Hall IC 22 as a first signal detector, a second Hall IC 23 as a second signal detector, a third Hall IC 24 as a third signal detector, and a first housing 31 for accommodating the first, second, and third Hall ICs 22-24.

The EPS-ECU 11 includes a CPU 12 as a signal detection circuit, a power source 13, a regulator 14, and a second housing 32 for accommodating the CPU 12, the power source 13, and the regulator 14. The power source 13 is grounded to a chassis of the vehicle (i.e., chassis earth) and supplies electric power to the torque sensor 21 through the power lines PL1-PL3. The regulator 14 is used to keep constant a voltage and a current outputted from the power source 13. The CPU 12 receives the torque signal transmitted from the torque sensor 21 and performs computations necessary to control the motor.

The first power supply line PL1 connects the power source 13 to the first Hall IC 22. The second power supply line PL2 connects the power source 13 to the second Hall IC 23. The third power supply line PL3 connects the power source 13 to the third Hall IC 24. A power line connector 42 connects the first power line PL1 and the second power line PL2 together. In such an approach, even when one of the first power line PL1 and the second power line PL2 is broken, each of the first Hall IC 22 and the second Hall IC 23 can be supplied with electric power through the other of the first power line PL1 and the second power line PL2. Further, the third power line PL3 is connected to the first power line PL1 between a rectifier device 41 and the first Hall IC 22 and connected to the second power line PL2 between a rectifier device 41 and the second Hall IC 23.

Thus, the third Hall IC 24 can be supplied with electric power through the first and second power lines PL1, PL2. In this way, the first and second power lines PL1, PL2 are used to supply electrical power to the third Hall IC 24. In such an approach, the length of the third power line PL3 can be reduced, and there is no need to provide a rectifier device 41 to the third power line PL3. That is, the number of rectifier devices can be less than the number of Hall ICs connected in parallel to each other.

The rectifier device 41 is provided to each of the first and second power lines, PL1, PL2 between the power source 13 and the power line connector 42. The rectifier device 41 allows an electric current in a direction from the power source 13 to the Hall ICs 22-24. In contrast, the rectifier device 41 blocks the electric current in opposite direction.

Thus, the power line connector 42 prevents an earth fault current to flow from one of the first and second power lines PL1, PL2 to the other of the first and second power lines PL1, PL2. Therefore, even when an earth fault occurs in one of the first and second power lines PL1, PL2, each of the first, second, and third Hall ICs 22-24 can be supplied with electric power from the power source 13 through the other of the first and second power lines PL1, PL2. In this way, even when the earth fault occurs in one of the first and second power lines PL1, PL2, each of the first, second, and third ICs 22-24 can transmit a detection signal to the CPU 12.

The regulator 14 converts an input voltage into a predetermined output voltage. The regulator 14 is provided to each of the first power line PL1 and the second power line PL2 between the rectifier device 41 and the power source 13. In such an approach, even if the regulator 14 of one of the first and second power lines PL1, PL2 is broken due to an earth fault current caused by an earth fault occurring in the one of the first and second power lines PL1, PL2, the regulator 14 of the other of the first and second power lines PL1, PL2 can be used.

Each of the first, second, and third Hall ICs 22-24 is connected in parallel to the power source 13. The first Hall IC 22 detects a predetermined target and outputs a first detection signal indicative of the detected target. The second Hall IC 23 detects the predetermined target and outputs a second detection signal indicative of the detected target. The third Hall IC 24 detects the predetermined target and outputs a third detection signal indicative of the detected target.

In the second embodiment, each of the first, second and third Hall ICs 22-24 detects a motor torque by detecting a magnetic field. Therefore, each of the first, second, and third detection signals corresponds to the torque signal. The first, second and third detection signals outputted from the first, second and third Hall ICs 22-24 are inputted to the CPU 12 of the EPS-ECU 11.

The first signal line SL1 connects the first Hall IC 22 to the CPU 12 and carries the first detection signal to the CPU 12. The second signal line SL2 connects the second Hall IC 22 to the CPU 12 and carries the second detection signal to the CPU 12. The third signal line SL3 connects the third Hall IC 24 to the CPU 12 and carries the third detection signal to the CPU 12.

Like the first embodiment, the CPU 12 detects the first, second, and third detection signals through the first, second, and third signal lines SL1-SL3 and determines whether the first, second, and third detection signals are normal. Specifically, the CPU 12 compares two of the first, second, and third detection signals and determines whether the compared two signals are normal.

According to the first embodiment, when one of the first and second detection signals is abnormal, it is difficult to determine which of the first and second detection signals is normal.

In contrast, according to the second embodiment, when one of the first, second, and third detection signals is abnormal, two normal detection signals can be detected by comparing the two normal detection signals. Thus, steering assist can be performed based on the normal detection signals. Accordingly, operation rates of the signal detection apparatus 1 can be raised.

If two of the first, second, and third detection signals are abnormal, it is difficult to determine which of the first, second, and third detection signals is normal. In such a case, therefore, the steering assist is stopped.

The first, second, and third Hall ICs 22-24 are connected in parallel to each other through the first ground line GL1. Further, the first, second, and third Hall ICs 22-24 are connected in parallel to each other through the second ground line GL2. In such an approach, even when one of the first and second ground lines GL1, GL2 is broken, each of the first, second, and third Hall ICs 22-24 can be grounded through the other of the first and second ground lines GL1, GL2. Thus, the signal detection apparatus 1 has redundancy so that reliability of the signal detection apparatus 1 can be ensured.

Since the first, second, and third Hall ICs 22-24 are supplied with electric power from the power source 13 of the EPS-ECU 11, there is a need that a ground potential of the first, second, and third Hall ICs 22-24 is equal to a ground potential of the power source 13, i.e., the EPS-ECU 11. Therefore, as shown FIG. 3, the first, second, and third Hall ICs 22-24 are grounded on a EPS-ECU 11 side, not a torque sensor 21 side.

If a ground line is provided to each Hail IC, the number of ground lines needs to be equal to the number of Hall ICs. According to the second embodiment, two ground lines GL1, GL2 are shared among three Hall ICs 22-24. In such an approach, the number of ground lines can be less than the number of Hall ICs. Further, even when one of the two ground lines GL1, GL2 is broken, the Hall ICs 22-24 can be grounded through the other of the two ground lines GL1, GL2. Thus, the signal detection apparatus 1 has redundancy so that reliability of the signal detection apparatus 1 can be ensured.

The first, second, and third Hall ICs 22-24, the power line connector 42, and the rectifier device 41 are accommodated in the first housing 31. The CPU 12 and the power source 13 are accommodated in the second housing 32.

Figure 4:
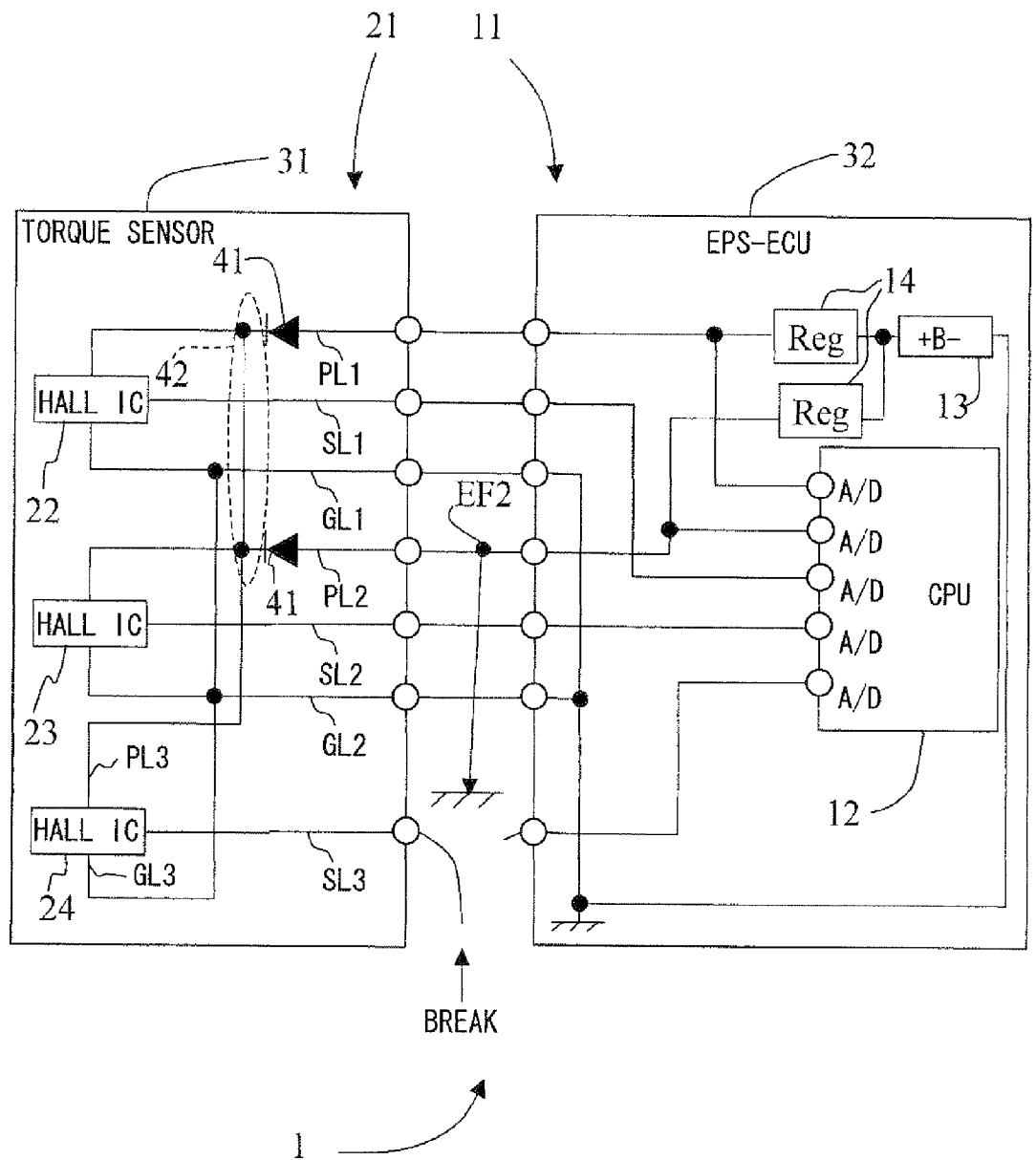
FIG. 4 is a diagram illustrating an electric current flow observed when one power line is broken in the signal detection apparatus of FIG. 3.

The signal detection apparatus 1 operates as shown in FIG. 4, when an earth fault occurs at a point EF2 of the second power line PL2. In this case, a potential of the second power line PL2 decreases at the point EF2, and an electric current flowing through the second power line PL2 flows to the earth from the point EF2. As a result, the first, second, and third Hall ICs 22-24 cannot be supplied with electric power through the second power line PL2. In contrast, an electric current flowing through the first power line PL1 does not flow to the point EF2 through the power line connector 42, because the rectifier device 41 is provided to the second power line PL2. Therefore, even when the earth fault occurs in the second power line PL2, the first, second, and third Hall ICs 22-24 can be supplied with electric power through the first power line PL1.

The signal detection apparatus 1 operates as shown in FIG. 4, when a line break occurs in the third signal line SL3. In this case, the third detection signal outputted from the third Hall IC 24 through the third signal line SL3 does not reach the CPU 12. Therefore, the third detection signal detected by the CPU 12 indicates a torque different from a torque indicated by each of the first and second detection signals detected by the CPU 12. The CPU 12 determines whether the first and second detection signals are equal to each other, the second and third detection signals are equal to each other, and the first and third detection signals are equal to each other. As a result, the CPU 12 determines that the first and second detection signals are equal to each other, the second and third detection signals are different from each other, and the first and third detection signals are different from each other. Based on the determination that the first and second detection signals are equal to each other, the CPU 12 concludes that the first and second detection signals are normal. In contrast, based on the determination that the second and third detection signals are different from each other, and that the first and third detection signals are different from each other, the CPU 12 concludes that the third detection signal is abnormal.

In this case, the CPU 12 performs computations necessary to control the motor based on the first and second determination signals.

According to the first embodiment, when the first and second detection signals indicate different torques, it is difficult to determine which of the first and second detection signals is normal. In contrast, according to the second embodiment, even when one of the first, second, and third detection signals indicates a torque different from a torque indicated by each of the other two of the first, second, and third detection signals, it is possible to determine which of the first, second, and third detection signals are normal. Therefore, the steering assist can be performed based on the normal detection signals.

As mentioned previously, if the CPU 12 determines that two of the first, second, and third detection signals are abnormal, it is difficult to determine which of the first, second, and third detection signals is normal. Therefore, the steering assist is stopped.

Third Embodiment

Figure 5:
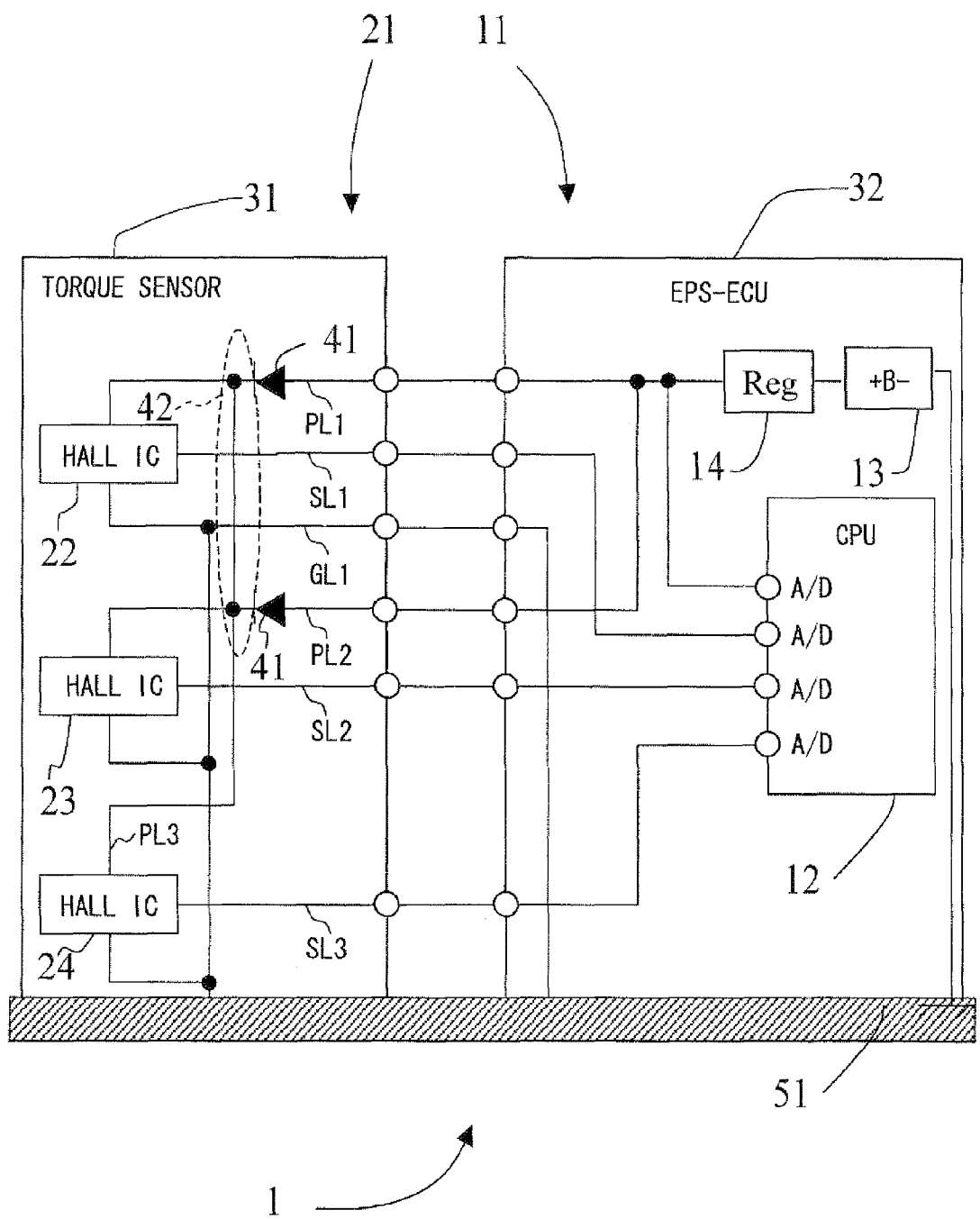
FIG. 5 is a diagram illustrating a signal detection apparatus according to a third embodiment of the present invention.
Figure 6:
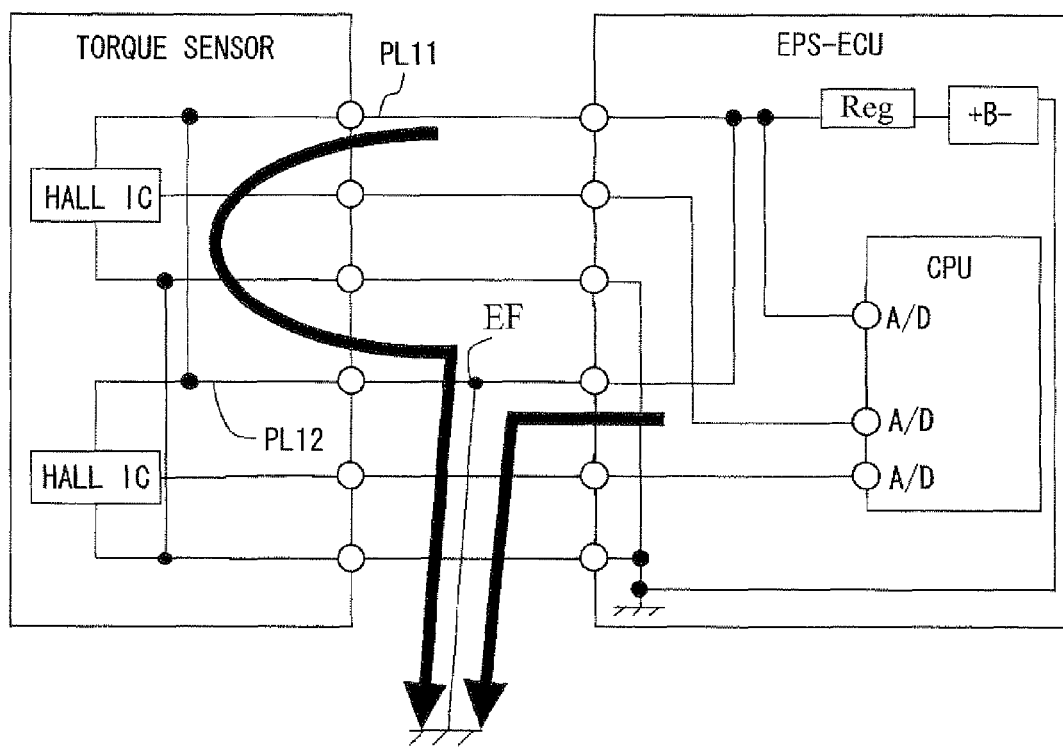
FIG. 6 is a diagram illustrating a signal detection apparatus according to a related art.

A signal detection apparatus 1 according to a third embodiment of the present invention is described below with reference to FIG. 5. A difference between the second and third embodiments is as follows.

In the third embodiment, the second ground line GL2 is eliminated. The first, second, and third Hall ICs 22-24 are grounded to a chassis 51 of the vehicle. As mentioned previously, the power source 13 is also grounded to the chassis 51 of the vehicle. Therefore, a ground potential of the first, second, and third Hall ICs 22-24 can be equal to a ground potential of the power source 13. Alternatively, the first ground line GL1 can be eliminated instead of the second ground line GL2. Even in this case, the first, second, and third Hall ICs 22-24 are grounded to the chassis 51 of the vehicle.

Calibration can be performed before shipment so that a potential difference between the first ground line GL1 and the chassis earth can be zero.

Modifications

The embodiments described above can be modified in various ways. For example, the rectifier device 41 can be a device other than a diode, as long as the device can allow an electric current in one direction and block the electric current in opposite direction.

Such changes and modifications are to be understood as being within the scope of the present invention as defined by the appended claims.

What is claims:
1. A power supply circuit comprising:
a power source;
a first load connected in parallel to the power source;
a second load connected in parallel to the power source;
a first power line configured to connect the power source to the first load;
a second power line configured to connect the power source to the second load;
a power line connector configured to connect the first power line and the second power line together in such a manner that even when one of the first and second power lines is broken, each of the first and second loads is supplied with electric power from the power source through the other of the first and second power lines;
a first rectifier device connected to the first power line between the power source and the power line connector, the first rectifier device allowing an electric current in a first direction from the power source to the first load and blocking the electric current in a second direction opposite to the first direction; and
a second rectifier device connected to the second power line between the power source and the power line connector, the second rectifier device allowing the electric current in a third direction from the power source to the second load and blocking the electric current in a fourth direction opposite to the third direction.

2. The power supply circuit according to claim 1, further comprising:
a first regulator connected to the first power line between the first rectifier device and the power source; and
a second regulator connected to the second power line between the second rectifier device and the power source, wherein
each of the first and second regulators converts an input voltage into a predetermined output voltage.

3. A signal detection apparatus comprising:
a first signal detector configured to output a first signal by detecting a predetermined target;
a second signal detector configured to output a second signal by detecting the predetermined target;
a power source connected in parallel to each of the first and second signal detectors;
a first power line configured to connect the power source to the first signal detector;
a second power line configured to connect the power source to the second signal detector;
a first signal line carrying the first signal;
a second signal line carrying the second signal;
a signal detection circuit configured to detect the first and second signals through the first and second signal lines;
a power line connector configured to connect the first power line and the second power line together in such a manner that even when one of the first and second power lines is broken, each of the first and second signal detectors is supplied with electric power from the power source through the other of the first and second power lines;
a first rectifier device connected to the first power line between the power source and the power line connector, the first rectifier device allowing an electric current in a first direction from the power source to the first signal detector and blocking the electric current in a second direction opposite to the first direction; and
a second rectifier device connected to the second power line between the power source and the power line connector, the second rectifier device allowing the electric current in a third direction from the power source to the second signal detector and blocking the electric current in a fourth direction opposite to the third direction.

4. The signal detection apparatus according to claim 3, further comprising:
a first regulator connected to the first power line between the first rectifier device and the power source; and
a second regulator connected to the second power line between the second rectifier device and the power source, wherein
each of the first and second regulators converts an input voltage into a predetermined output voltage.

5. The signal detection apparatus according to claim 3, wherein
the first and second signals are opposite in phase.

6. A signal detection apparatus comprising:
a first signal detector configured to output a first signal by detecting a predetermined target;
a second signal detector configured to output a second signal by detecting the predetermined target;
a third signal detector configured to output a third signal by detecting the predetermined target;
a power source connected in parallel to each of the first, second, and third signal detectors;

a first power line configured to connect the power source to the first signal detector;

a second power line configured to connect the power source to the second signal detector;

a third power line configured to connect the third signal detector to each of the first and second power lines;

a first signal line carrying the first signal;

a second signal line carrying the second signal;

a third signal line carrying the third signal;

a signal detection circuit configured to detect the first, second, and third signals through the first, second, and third signal lines;

a power line connector configured to connect the first power line and the second power line together in such a manner that even when one of the first and second power lines is broken, each of the first and second signal detectors is supplied with electric power from the power source through the other of the first and second power lines;

a first rectifier device connected to the first power line between the power source and the power line connector, the first rectifier device allowing an electric current in a first direction from the power source to the first signal detector and blocking the electric current in a second direction opposite to the first direction; and a second rectifier device connected to the second power line between the power source and the power line connector, the second rectifier device allowing the electric current in a third direction from the power source to the second signal detector and blocking the electric current in a fourth direction opposite to the third direction, wherein the third power line is connected to the first power line between the first rectifier device and the first signal detector and connected to the second power line between the second rectifier device and the second signal detector.

7. The signal detection apparatus according to claim 6, further comprising:

a first ground line configured to connect the first, second, and third signal detectors in parallel to each other; and a second ground line configured to connect the first, second, and third signal detectors in parallel to each other, wherein even when one of the first and second ground lines is broken, each of the first, second, and third signal detectors is grounded through the other of the first and second ground lines.

8. The signal detection apparatus according to claim 6, further comprising:

a first housing configured to accommodate the first, second, and third signal detectors, the power line connector, and the first and second rectifier devices; and a second housing configured to accommodate the power source and the signal detection circuit.

9. The signal detection apparatus according to claim 6, wherein the signal detection apparatus is used for an electric power steering apparatus that assists a steering of a vehicle based on a steering torque acting on the steering, and each of the first, second, and third signal detectors is a Hall integrated circuit configured to detect the steering torque.

10. The signal detection apparatus according to claim 9, wherein the power source is grounded to a chassis of the vehicle, and the first, second, and third signal detectors are grounded to the chassis of the vehicle.

* * * * *